United States Patent [19]
Hu et al.

[11] Patent Number: 5,444,589
[45] Date of Patent: Aug. 22, 1995

[54] ROTARY ACTUATOR DISK DRIVE WITH IDENTICAL DUAL-ELEMENT READ/WRITE TRANSDUCERS

[75] Inventors: Hung L. Hu, Los Altos Hills; Ching H. Tsang, Sunnyvale, both of Calif.

[73] Assignee: International Business Machines Corporation, Armonk, N.Y.

[21] Appl. No.: 162,513

[22] Filed: Dec. 2, 1993

[51] Int. Cl.⁶ .................. G11B 5/39; G11B 5/147; G11B 5/55
[52] U.S. Cl. .................. 360/113; 360/126; 360/106
[58] Field of Search .............. 360/97.01, 103, 104, 360/113, 125, 126, 106

[56] References Cited

U.S. PATENT DOCUMENTS

| | | | |
|---|---|---|---|
| 4,878,140 | 10/1989 | Gill et al. | 360/113 |
| 5,218,497 | 6/1993 | Tanabe et al. | 360/113 |
| 5,227,212 | 7/1993 | Ahlert et al. | 360/97.01 |
| 5,257,148 | 10/1993 | Solhjell et al. | 360/77.06 |
| 5,257,149 | 10/1993 | Meyer | 360/78.14 |
| 5,309,305 | 5/1994 | Nepela et al. | 360/113 |

*Primary Examiner*—Robert S. Tupper
*Assistant Examiner*—Jefferson Evans
*Attorney, Agent, or Firm*—Thomas R. Berthold

[57] ABSTRACT

A rotary actuator disk drive uses substantially identical dual-element inductive write/magnetoresistive read transducers for both the top and bottom disk surfaces. There is no requirement that the read elements be mechanically offset from the write elements, as is typically the case in rotary actuator disk drives due to the head-to-track skew caused by the inherent nonlinear path of the heads across the data tracks. The transducers are supported on the trailing ends of the head carriers in such a manner that the geometric centers of the read and write elements are aligned without any mechanical offset. Sense currents of opposite polarity are provided to the magnetoresisitve read elements adjacent the top and bottom disk surfaces to shift the magnetic centers of the top and bottom read elements in opposite directions relative to their geometric centers. The amount and direction of the magnetic shift is such that the read elements are effectively offset from their respective write elements so that the skew caused by the rotary actuator has minimal effect on alignment of the read and write elements with the data tracks.

14 Claims, 6 Drawing Sheets

ROTARY ACTUATOR DISK DRIVE WITH IDENTICAL DUAL-ELEMENT READ/WRITE TRANSDUCERS

TECHNICAL FIELD

This invention relates in general to data recording disk drives, and more particularly to magnetic recording rotary actuator disk drives that use dual-element read/write transducers.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read or write operations. There are typically a plurality of disks separated by spacer rings and stacked on a hub that is rotated by a disk drive motor. A housing supports the drive motor and head actuator and surrounds the head and disk to provide a substantially sealed environment for the head-disk interface.

In conventional magnetic recording disk drives, the head carrier is an air-bearing slider that rides on a bearing of air above the disk surface when the disk is rotating at its operational speed. The slider is maintained next to the disk surface by a suspension that connects the slider to the actuator. The slider flies over the disk surface as a consequence of a balance of the spring force from the suspension and the air pressure generated by the velocity of the rotating disk.

In contrast to conventional air-bearing disk drives, liquid-bearing disk drives have been proposed that use a head carrier that is at least partially supported by a liquid film on the disk. In one type of liquid-bearing disk drive, as described in IBM's pending application, U.S. Ser. No. 264,604, filed Oct. 31, 1988, and published May 9, 1990, as European published application EP 367510, and in U.S. Pat. No. 5,097,368 assigned to Conner Peripherals, a relatively thick, continuously recirculating liquid film is maintained on the disk surface and the head carrier is maintained in continuous contact with the liquid film when the disk is rotating at its normal operating speed. In a variation of the liquid-bearing disk drive, as described in U.S. Pat. No. 4,901,185 assigned to Toshiba and U.S. Pat. No. 5,202,803 assigned to IBM, a combined air and liquid bearing supports the head carrier, which is in contact or partial contact with a relatively thin liquid film on the disk.

In both air-bearing and liquid-bearing disk drives, the most common form of actuator is a rotary actuator that moves the head carriers in a nonlinear, generally arcuate path across the disk surfaces. Typically, there are two head carriers per disk, one for each of the "top" and "bottom" disk surfaces, that are attached to the actuator so that the carriers move in unison on the opposite surfaces of the disk. Because the rotary actuator moves in an arcuate path, the heads are not aligned perpendicular to the data tracks, but are skewed relative to the tracks, the amount of skew varying with the radial position.

In the conventional disk drive, a single inductive read/write head performs both read and write functions on the disk. With this type of single-element head, the skew created by the use of a rotary actuator does not present any special problem of head alignment with the data tracks on the disk. However, recent IBM disk drives use dual-element heads, i.e., an inductive element for writing and a magnetoresistive (MR) element for reading. Because the two elements are spaced from one another in a direction perpendicular to the trailing end of the carrier, a rotary actuator is not able to maintain both elements in simultaneous alignment with the data tracks due to the inherent nonlinear path across the disk surface. To compensate for this, dual-element heads are fabricated with the read and write elements offset from one another in a direction parallel to the trailing end of the carrier, the amount of offset being determined by the average skew of the heads. However, since the misalignment of the two elements due to the skew, as seen from the top surface of the disk, is the mirror image of the misalignment of the elements as seen from the bottom surface of the disk, the head with offset read and write elements associated with the top surface must be the mirror image of the head associated with the bottom surface. The result is that two different types of heads must be fabricated: one for the top surfaces of the disks and the other for the bottom surfaces of the disks. This complicates the head manufacturing process and disk drive assembly process.

What is needed is a rotary actuator disk drive that uses identical dual-element read/write transducers for all disk surfaces and that has both elements effectively aligned with the data tracks.

SUMMARY OF THE INVENTION

The present invention is a rotary actuator disk drive that uses substantially identical dual-element inductive write/magnetoresistive read transducers for both the top and bottom disk surfaces. The transducers are supported on the trailing ends of the head carriers in such a manner that the geometric centers of the read and write elements are aligned without any mechanical offset. The sense current for the magnetoresistive elements is provided with opposite polarity to the elements on the top and bottom disk surfaces to shift the magnetic centers of the top and bottom read elements in opposite directions relative to their geometric centers. The amount and direction of the magnetic shift is such that the read elements are effectively offset from their respective write elements so that the skew caused by the rotary actuator has minimal affect on alignment of the read and write elements with the data tracks.

For a fuller understanding of the nature and advantages of the present invention, reference should be made to the following detailed description taken together with the accompanying drawings.

DESCRIPTION OF THE PREFERRED EMBODIMENTS

Figure 1:
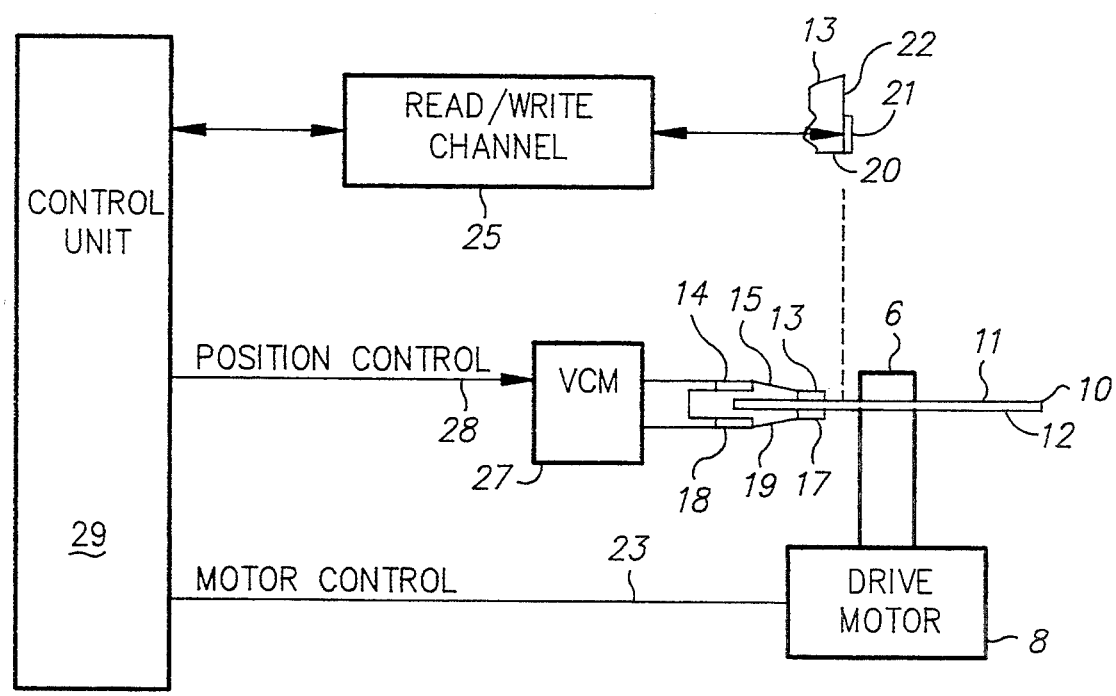
FIG. 1 is a block diagram of a rotary actuator magnetic recording disk drive incorporating the present invention.

A disk drive incorporating the present invention is shown schematically in FIG. 1.

A magnetic recording disk 10, having "top" 11 and "bottom" 12 surfaces, is supported on a spindle 6 and rotated by a disk drive motor 8. The magnetic recording media on each disk surface 11, 12 is in the form of an annular pattern of concentric data tracks (not shown).

A head carrier 13 is positioned on the top surface 11 of disk 10. Carrier 13 is an air-bearing slider having an air-bearing surface or disk side 20 and a trailing end 22. The head carrier 13 supports a dual-element read/write transducer 21 on its trailing end 22 for reading and writing data to the magnetic media on disk surface 11. In the preferred embodiment, the carrier 13 is a three-rail, air-bearing slider of the type described in IBM's U.S. Pat. No. 4,894,740, with the transducer 21 being located on the trailing end of the center rail. Carrier 13 is attached to an actuator arm 14 by means of a suspension 15. The suspension 15 provides a slight spring force that biases the carrier 13 against the disk surface 11. A second carrier 17, also supporting a dual-element read/write transducer, is positioned on the bottom surface 12 of disk 10 and is attached to an actuator arm 18 by means of a suspension 19.

Actuator arms 14, 18 are attached to a rotary actuator 27. The actuator 27 is typically a voice coil motor (VCM) that comprises a coil movable within a fixed magnetic field, the direction and velocity of the coil movements being controlled by the motor current signals supplied by a control unit 29. As the disk 10 rotates, the rotary actuator 27 moves the carriers 13, 17 in a generally arcuate path radially in and out over their respective disk surfaces 11, 12 so that the read/write transducers may access different portions of the disk surfaces where data is desired to be read or recorded.

In the conventional type of air-bearing disk drive, the rotation of the disk generates an air bearing between the carrier and its associated disk surface. The air bearing thus counterbalances the slight spring force of the suspension and supports the carrier off and slightly away from the disk surface by a small, substantially constant spacing during operation. The present invention is also applicable to other types of disk drives, however, such as contact or near-contact recording disk drives, wherein the head carrier is urged into contact with the disk during read and write operations.

The various components of the disk storage system are controlled in operation by control signals generated by control unit 29, such as access control signals and internal clock signals. Typically, the control unit 29 comprises logic control circuits, storage means, and a microprocessor, for example. The control unit 29 generates control signals to control various system operations, such as drive motor control signals on line 23 and track position and seek control signals on line 28. The control signals on line 28 provide the desired current profiles to optimally move and position the carriers 13, 17 to the desired data track on the respective disk surfaces 11, 12. Read and write signals are communicated to and from the read/write heads, such as head 21, by means of the read/write channel 25. Because the read/write head 21 is a dual-element head that includes an MR sensor or element for reading data, a current source (not shown) is used to apply a sense current to the MR sensor, and the read/write channel 25 includes MR signal amplification and detection circuitry.

The above description of a typical magnetic recording disk drive according to the present invention, and the accompanying illustration of FIG. 1, is meant to be representative of many types of rotary actuator disk drives. For example, disk drives may contain a number of disks and rotary actuators, and each actuator may support a number of head carriers.

Figure 2:
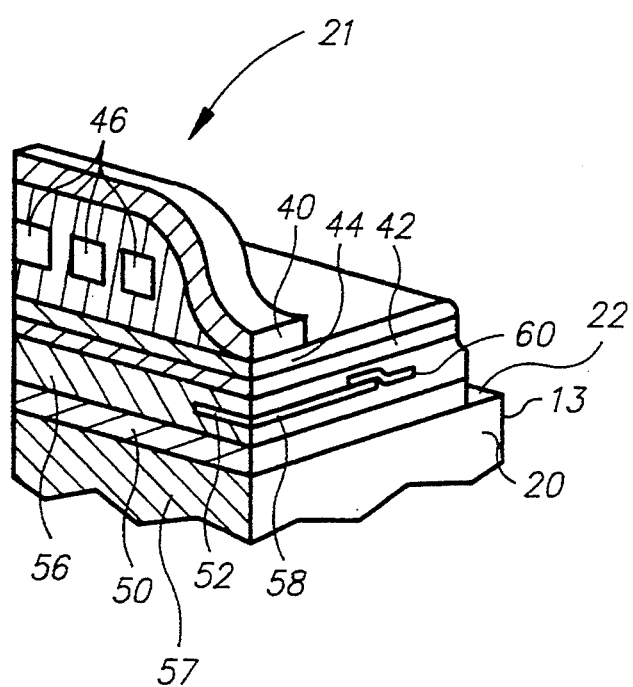
FIG. 2 is a sectional view of a dual-element read/write magnetic recording head usable with the disk drive of FIG. 1.

Referring now to FIG. 2, the read/write head 21 formed on carrier 13 is shown in sectional view to illustrate the films making up the structure. The basic head comprises separate read and write structures formed over each other and sharing some common elements. The write transducer is a thin film inductive head comprising pole tips 40, 42 that define a sensing end or write gap 44 on the disk side 20 of the carrier 13. The copper coils 46 making up the inductive write head are shown in sectional view between the pole pieces 40, 42. A first MR shield 50 is deposited on an oxide film grown on the trailing end 22 of carrier 13. The inductive pole piece 42 also serves as a second MR shield. MR shields 42, 50 are spaced apart from the MR sensor 52, which is located in the middle of gap material 56 between the two shields. The MR sensor 52 has a sensing end 58 on the disk side 20 of carrier 13. The MR sensor film 52 has electrical leads attached to its ends, such as lead 60 shown in FIG. 2. Since FIG. 2 is a sectional view showing the interior of the read/write head 21, the opposite half of sensor film 52 and its associated electrical lead is not shown. The electrical leads are connected to the current source to supply a sense current through MR sensor 52 that is used to detect changes in resistance corresponding to changes in magnetic flux from the magnetic recording disk. The MR sensor 52 and the coils 46 of the write transducer are electrically connected to the circuitry making up the read/write channel 25 (FIG. 1). As shown in FIG. 2, the geometric centers of the sensing ends of the write and read transducers, i.e., write gap 44 and MR sensing end 58, lie in the same plane 57 that is generally perpendicular to both trailing end 22 and disk side 20 of carrier 13.

Figure 3:
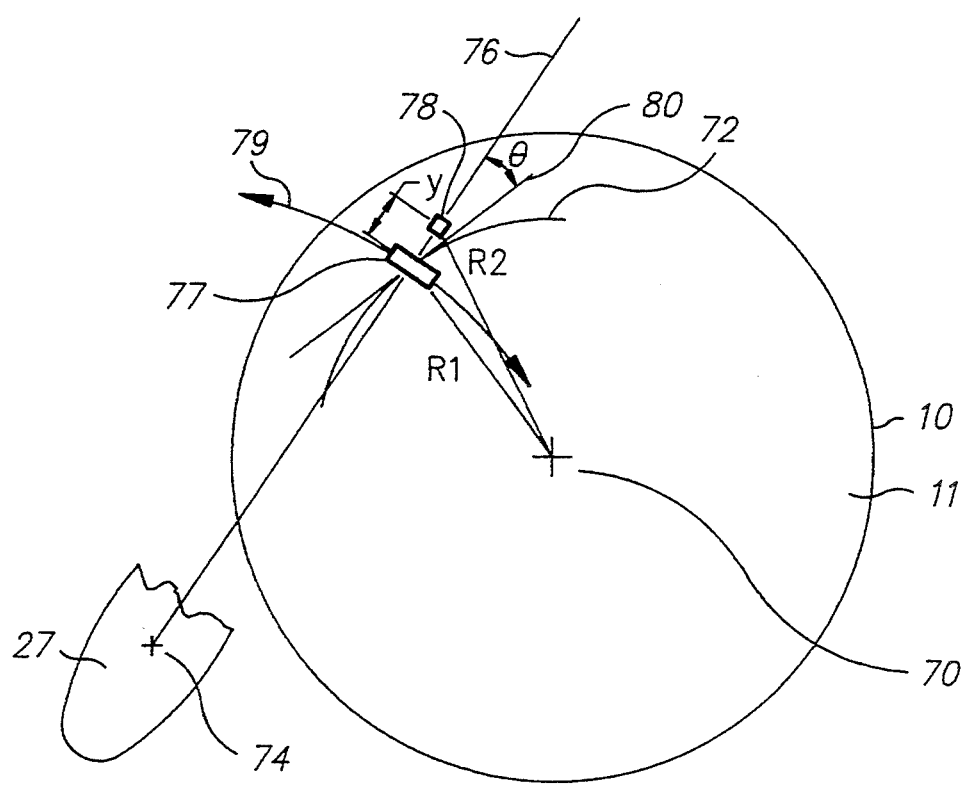
FIG. 3 is a geometrical drawing illustrating the problem of head skew in a rotary actuator disk drive having a dual-element read/write head.

FIG. 3 is a geometrical drawing showing how the skew caused by a rotary actuator results in misalignment of the read and write elements in a dual-element read/write transducer. The disk 10 has a center of rotation 70 and a typical data track 72. The rotary actuator 27 has an axis of rotation 74 and a central arm axis 76. Arm axis 76 passes through the geometrical center of both read element 77 and write element 78. The read element 77 follows an arcuate path 79 across the surface 11 of disk 10 as the actuator 27 pivots about axis 74. It is apparent from FIG. 3 that because the read and write elements 77, 78 are spaced apart a distance y in a direction along arm axis 76, they are located at different radii, $R_1$ and $R_2$ respectively, from the center 70 of disk 10. The arm axis 76, and the read and write elements 77, 78 along it, are skewed by an angle $\Theta$ relative to a tangent 80 to the data track 72. As a result, if the read element 77 is aligned with data track 72 as shown in FIG. 3, the write element 78 will be misaligned with the data track. The actuator 27 would be required to move the head carrier to read and write data on the same track. This is undesirable.

Figure 4:
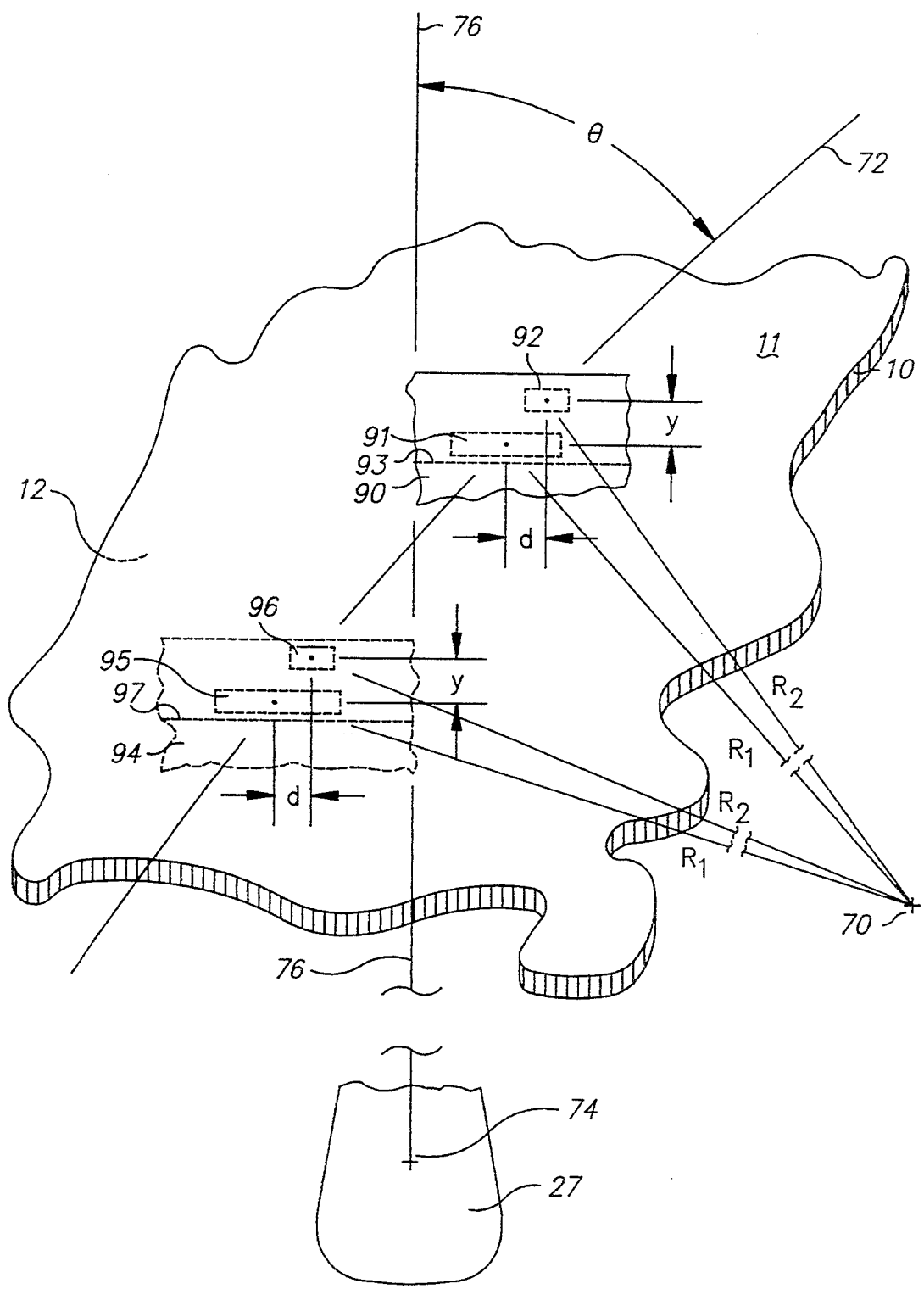
FIG. 4 is a geometrical drawing showing the prior art rotary actuator disk drive having two different dual element read/write heads for respective top and bottom disk surfaces to avoid the problem of head skew.

To solve this problem, the read and write elements in the previously described IBM disk drives are offset from one another by the average amount of skew across the data tracks. This is illustrated by the geometrical drawing of FIG. 4 that depicts a portion of disk 10 having a top surface 11 and a bottom surface 12. A head carrier 90 having a read element 91 and a write element 92 located on its trailing end 93 is located on top disk surface 11. A head carrier 94 having a read element 95 and a write element 96 located on its trailing end 97 is located on bottom disk surface 12. In actuality, carriers 90, 94 would be located precisely over one another on opposite sides of disk 10, but are shown spaced apart for ease of illustration. Thus, both carriers 90 and 94 are located along the arm axis 76 of rotary actuator 27 with their respective trailing ends 93, 97 being generally perpendicular to arm axis 74. The carriers 90, 94 are also located on data track 72, which can be considered a straight line in the very short region near the read and write elements. As shown, the read and write elements 91, 92 on carrier 90 and the read and write elements 95, 96 on carrier 94 are all aligned with the data track 72. Thus, unlike the configuration of FIG. 3, radii $R_1$ and $R_2$ are the same. However, in order to accomplish this track alignment for both the read and write elements in a dual-element head on a rotary actuator, it is necessary that the elements be offset from one another in a direction parallel to the trailing end of the carrier. Thus, on carrier 90, the geometric centers of read element 91 and write element 92 are offset from one another by a distance d parallel to trailing end 93. This offset distance is given by the following:

$$d = y \cdot \tan \Theta;$$

where y is the spacing distance between the read and write elements in a direction perpendicular to the trailing end 93 and $\Theta$ is the skew angle. Similarly, on carrier 94, the geometric centers of read element 95 and write element 96 are also offset from one another by the distance d parallel to trailing end 97. However, because carrier 94 is located on the bottom side 12 of disk 10, the location of its read and write elements is required to be essentially a mirror image of the location of the read and write elements on carrier 90. This means that two different carriers, with different part numbers, must be manufactured and then tracked through the disk drive assembly process to assure their assembly on the proper actuator arm.

The present invention solves this problem. The invention is a rotary actuator disk drive as described in FIGS. 1-3, i.e., one in which all of the head carriers 13 and dual-element heads 21 are substantially identical. On each carrier, regardless of whether it is to be used on the top 11 or bottom 12 surface of the disk 10, the geometric centers of the read element sensing end 58 and write gap 44 lie in the same plane 57 generally perpendicular to both the disk side 20 and trailing end 22 of the carrier. The offset of the read and write elements that is required to maintain track alignment of both elements is accomplished magnetically by proper electrical connection of the read elements in the manner to be described and shown in FIGS. 5 and 6.

Figure 5:
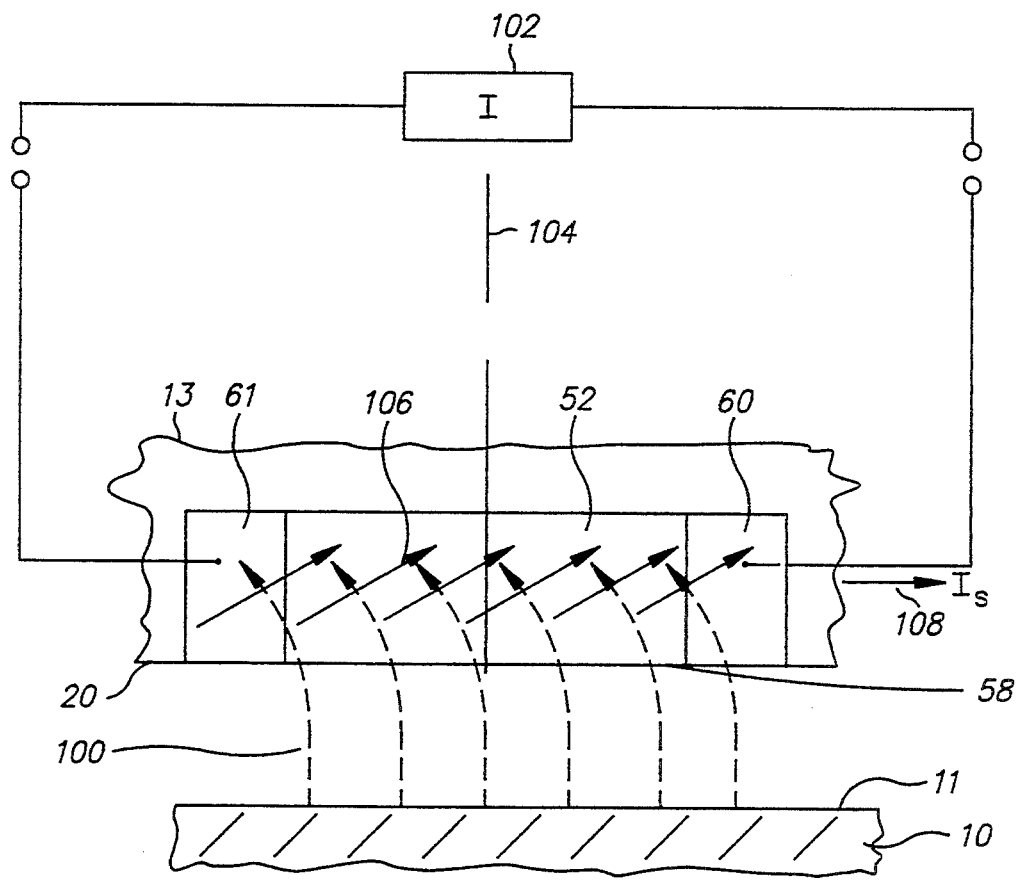
FIG. 5 is an illustration of the shift of the magnetic center from the geometric center in a current biased MR sensor.
Figure 5:
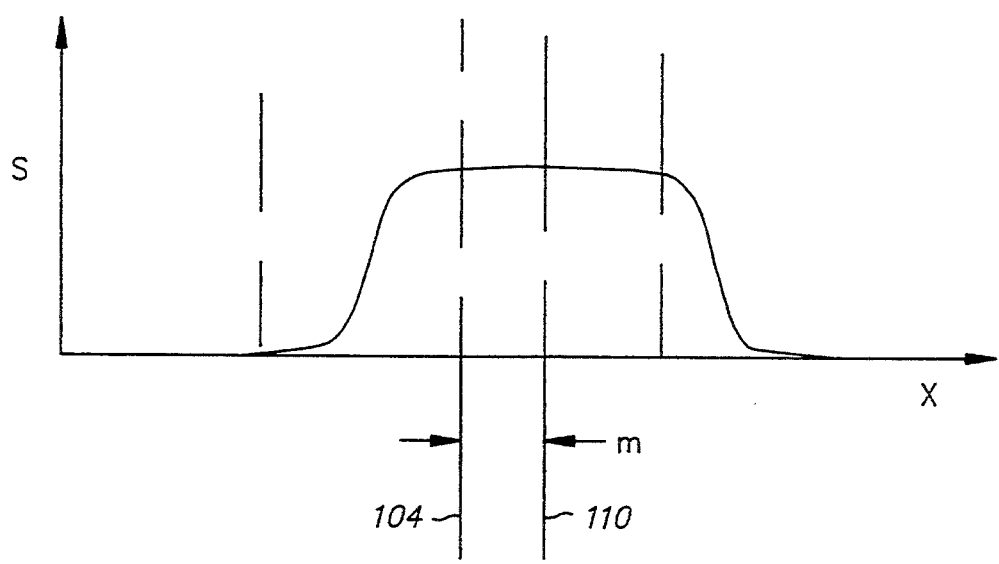

FIG. 5 depicts in its top portion head carrier 13 with MR read sensor 52 and disk 10 with top surface 11. The sensing end 58 on the disk side 20 of carrier 13 is shown facing disk surface 11 from which magnetic field lines 100 emanate. The ends of MR sensor 52 have electrical leads 60, 61 that are electrically connected to a current source 102. The MR sensor 52 has a geometric center 104 that is aligned with the geometric center of the write gap 44 (FIG. 2) so that the read and write elements are not physically offset from one another.

The MR sensor 52 possesses a magnetic moment in the direction 106. The direction of this moment is caused by current biasing of the sensor from sense current $I_s$ having the direction 108. Current biasing of the MR sensor is typically done by use of an adjacent conductor film (shunt biasing) or an adjacent soft magnetic film (soft bias). The current through the adjacent conductor or soft bias film creates a magnetic moment in the film that causes the magnetic moment of the MR sensor to have a direction other than parallel to the direction of current.

Referring now to the bottom portion of FIG. 5, the signal strength S from MR sensor 52 is graphed as a function of position X along the sensor length. The center 110 of this signal profile is the magnetic center of MR sensor 52 and is shifted a distance m from the geometric center 104. The direction of this magnetic shift (to the right in FIG. 5) is determined by the direction 108 of the sense current $I_s$. This shift can be understood primarily by considering the effect of the magnetic field lines 100 near the two ends of the MR sensor 52. The field lines 100 propagate best into the MR sensor 52 only when they are perpendicular to the moment direction 106. At the end near lead 61, the field lines 100 enter the MR sensor and propagate in a direction away from the sensor 52. There is thus a relatively small contribution to S at this end of the sensor 52. Conversely, at the end near lead 60, the field lines 100 propagate in the direction of the sensor 52 so that the signal strength S is much higher. The result is a shift m in the signal profile to the right of geometric center 104. If the direction 108 of current $I_s$ were reversed, the shift m would be to the left of geometric center 104.

Since the moment direction 106 in MR sensor 52 is caused by the shunt or soft film biasing, which in turn is caused by the direction 108 of sense current $I_s$, a change in direction of the sense current will cause the magnetic shift m of the MR sensor 52 to be in the opposite direction (to the left of geometric center 104 in FIG. 5). This is because the direction 106 of the magnetic moment will now be down and to the right (instead of up and to the right in FIG. 5), and the field lines 100 will now turn to the right (instead of to the left in FIG. 5) so that the effect of the field lines 100 near the ends of MR sensor 52 will be reversed from that previously described for FIG. 5.

In the present invention, the carriers and their supported dual-element heads are physically identical for both the top and bottom disk surfaces, but the polarities of the sense currents are reversed between the top and bottom read elements. The result is that by appropriate selection of the spacing y between the read and write elements on the carriers and the value of $I_s$, the magnetic shift m can be used to provide the effective offset d required to maintain both the read and write elements aligned with the data track. The reversal of polarities between top and bottom read elements causes the magnetic shifts to be in the opposite directions for the top and bottom carriers, thus allowing the heads to be effectively the mirror images of one another.

Figure 6:
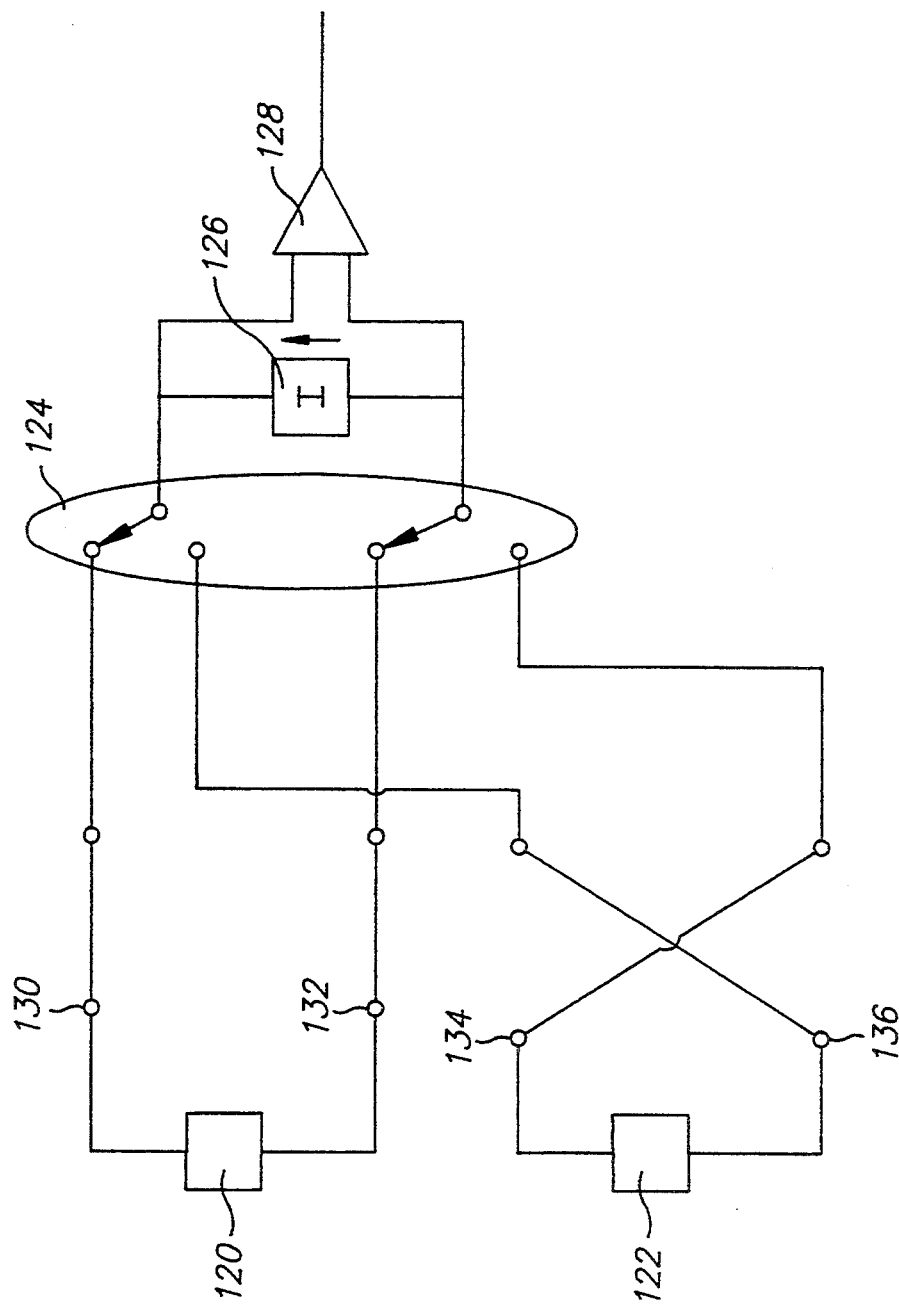
FIG. 6 illustrates the preferred electrical connection between a current source and top and bottom MR sensors to provide the correct direction and amount of effective offset of the read elements from the write elements.

FIG. 6 shows one embodiment for providing electrical connection to top 120 and bottom 122 read elements. Each of the substantially identical MR sensors 120, 122 is electrically connected through a switch 124 to a current source 126 that is coupled to the read preamplifier 128 of the read/write channel. When the switch is in the position shown in FIG. 6, sense current flows in the direction from lead 130 through top MR sensor 120 to lead 132. When the switch 124 is in the other position, sense current flows in the direction from lead 136 through bottom MR sensor 122 to lead 134. Since the current is in the opposite directions in the two MR sensors 120, 122, the magnetic shift m to produce the required offset d will be in opposite directions in the two MR sensors. This allows both the top and bottom sensors to be physically identical so that only one carrier with its supported dual-element head needs to be manufactured.

The following approximate values of various parameters in an actual disk drive can be used to illustrate an implementation of the present invention. For a 3.5-inch disk drive, the average value of skew is approximately 10 degrees and the magnetic shift m is approximately 0.5 microns. Since the spacing y between the elements is approximately 3 microns, which may be increased or decreased by approximately 1 micron by changing the head design, the mechanical offset d required to compensate for skew is also approximately 0.5 microns. Thus, by controlling the direction of current $I_s$ to be in the opposite directions in the top and bottom carriers, the dual-element heads can be made identical on the top and bottom carriers and the magnetic shift m used to provide the required offset of the elements.

While the preferred embodiments of the present invention have been illustrated in detail, it should be apparent that modifications and improvements may be made to the invention without departing from the spirit and scope of the invention as described in the following claims.

What is claimed is:

1. A data recording disk drive of the type having a write transducer for writing data on the disk and a separate read transducer for reading data from the disk, the disk drive comprising:
   at least one data disk;
   a motor connected to the disk for rotating the disk;
   a first carrier for supporting a write transducer and a read transducer, the first carrier having a disk side and a trailing end;
   a second carrier for supporting a write transducer and a read transducer, the second carrier having a disk side and a trailing end;
   a rotary actuator connected to the first and second carriers for simultaneously moving the first carrier in a generally arcuate path across one surface of the disk, and the second carrier in a generally arcuate path across the opposite surface of the disk so the transducers may access data on their associated disk surfaces;
   a first write transducer attached to the trailing end of the first carrier and having a sensing end oriented toward the disk side of the first carrier;
   a first read transducer attached to the trailing end of the first carrier and having a sensing end oriented toward the disk side of the first carrier, the sensing end of the first read transducer being in a fixed position relative to the sensing end of the first write transducer and having its magnetic center shifted in a first direction from its geometric center;
   a second write transducer attached to the trailing end of the second carrier and having a sensing end oriented toward the disk side of the second carrier;
   a second read transducer attached to the trailing end of the second carrier and having a sensing end oriented toward the disk side of the second carrier, the sensing end of the second read transducer having a fixed position relative to the sensing end of the second write transducer that is substantially identical to the fixed position of the first read transducer sensing end relative to the first write transducer sensing end, the sensing end of the second read transducer having its magnetic center shifted in a second direction from its geometric center that is opposite to said first direction, the amount of the magnetic shift of the first and second read transducer sensing ends from their respective geometric centers being substantially the same; and
   means for supporting the motor and actuator.

2. The disk drive according to claim 1 wherein the first and second carriers are air-bearing sliders.

3. The disk drive according to claim 1 wherein the geometric centers of the sensing ends of the associated read and write transducers on each of the carriers lie in a plane generally perpendicular to the trailing end of the associated carrier.

4. The disk drive according to claim 1 wherein the first and second write transducers are inductive write elements.

5. The disk drive according to claim 1 wherein the first and second read transducers are magnetoresistive read elements.

6. The disk drive according to claim 5 further comprising means coupled to the magnetoresistive read elements for processing the signals representing data detected from the disk by the read elements.

7. The disk drive according to claim 1 wherein the first and second write transducers are inductive write elements, and the first and second read transducers are magnetoresistive read elements.

8. The disk drive according to claim 7 wherein the sensing ends of the inductive write elements are write gaps, and wherein the sensing end of each of the write gaps is spaced from its associated magnetoresistive read element in a direction generally perpendicular to the trailing end of its associated carrier.

9. The disk drive according to claim 8 further comprising means coupled to the first magnetoresistive read element for generating a sense current, and means coupled to the second magnetoresistive read element for generating a sense current in a direction opposite to that of the first sense current.

10. A magnetic recording disk drive comprising:
    a magnetic recording disk having top and bottom surfaces;
    a motor connected to the disk for rotating the disk;
    a top carrier maintained near the top surface of the disk and having a trailing end;
    a first read/write head supported on the trailing end of the top carrier and including a first write element and a first magnetoresistive sensor having its geometric center aligned with the geometric center of the first write element;
    a bottom carrier maintained near the bottom surface of the disk and having a trailing end;

a second read/write head supported on the trailing end of the bottom carrier and including a second write element and a second magnetoresistive sensor having its geometric center aligned with the geometric center of the second write element;

a rotary actuator connected to the top and bottom carriers for moving the carriers in unison across the top and bottom disk surfaces, respectively; and a current source electrically coupled to the first and second magnetoresistive sensors, the sense current in the first magnetoresistive sensor being in generally the same direction as the magnetic moment of the first magnetoresistive sensor and the sense current in the second magnetoresistive sensor being in generally the opposite direction as the magnetic moment of the second magnetoresistive sensor, whereby the magnetic centers of the first and second magnetoresistive sensors are magnetically shifted in opposite directions from their respective geometric centers.

11. A disk drive according to claim 10 wherein the carriers are air-bearing sliders.

12. A disk drive according to claim 10 wherein the first and second write elements are spaced from the first and second magnetoresistive sensors, respectively, a predetermined distance and in a direction generally perpendicular to the trailing ends of the carriers, said predetermined distance being related to the amount of magnetic shift.

13. A disk drive according to claim 12 wherein if the rotary actuator has an approximate skew angle $\Theta$ and the predetermined spacing distance of the write elements from their respective magnetoresistive sensors is y, then the amount of the magnetic shift m of the magnetic centers of the magnetoresistive sensors is given approximately by $m = y \cdot \tan \Theta$.

14. A disk drive according to claim 13 wherein the current source is electrically coupled to the first magnetoresistive sensor to generate sense current in a first direction to shift the magnetic center of the first magnetoresistive sensor an amount m in a first direction, and electrically coupled to the second magnetoresistive sensor to generate sense current in a direction opposite to said first direction of sense current to shift the magnetic center of the second magnetoresistive sensor substantially the same amount m in an opposite direction to said first direction of magnetic shift of said first magnetoresistive sensor.

* * * * *